(12) United States Patent
Maldonado Cruz et al.

(10) Patent No.: US 10,220,793 B2
(45) Date of Patent: Mar. 5, 2019

(54) BICYCLE ATTACHMENT SYSTEM FOR A TRUCK BED

(71) Applicant: FORD GLOBAL TECHNOLOGIES, LLC, Dearborn, MI (US)

(72) Inventors: Julio Cesar Maldonado Cruz, Benito Juarez (MX); Carlos Miguel Chon Gaxiola, Cuautitlan Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/455,176

(22) Filed: Mar. 10, 2017

(65) Prior Publication Data
US 2018/0257581 A1    Sep. 13, 2018

(51) Int. Cl.
*B60R 13/01* (2006.01)
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .............. B60R 13/01; B60R 9/10; B60R 9/06
USPC ........................................ 224/403, 402, 924
See application file for complete search history.

(56) References Cited

U.S. PATENT DOCUMENTS

| | | | |
|---|---|---|---|
| 2,547,083 A * | 4/1951 | Lundgren | B62D 43/10 224/496 |
| 4,728,017 A * | 3/1988 | Mullican | B60R 9/00 224/328 |
| 4,828,312 A * | 5/1989 | Kinkel | B60R 11/06 16/94 R |
| 4,934,572 A | 6/1990 | Bowman et al. | |
| 5,322,335 A * | 6/1994 | Niemi | B60N 2/6009 296/39.1 |
| 5,362,173 A * | 11/1994 | Ng | B60R 9/048 224/315 |
| 5,642,845 A * | 7/1997 | Van Kooten | B60R 11/06 224/403 |
| 5,699,945 A * | 12/1997 | Micklish | B60R 9/00 224/402 |
| 5,875,947 A * | 3/1999 | Noel | B60R 9/048 211/17 |
| 5,924,615 A * | 7/1999 | McGarrah | B60R 9/00 220/482 |
| 6,092,852 A * | 7/2000 | Lawrence | B60R 9/00 220/841 |
| 6,179,181 B1 | 1/2001 | Johnson et al. | |
| 6,398,091 B1 | 6/2002 | Munoz et al. | |
| 6,435,594 B1 * | 8/2002 | Ekonen | B60J 7/041 296/100.09 |
| 6,527,154 B2 | 3/2003 | Larsen et al. | |
| 6,644,709 B2 * | 11/2003 | Inagaki | B60N 2/3013 296/37.14 |
| 6,679,408 B1 * | 1/2004 | Thomas | B60P 3/075 224/403 |
| 6,874,667 B2 * | 4/2005 | Dykstra | B60R 5/04 224/275 |

(Continued)

*Primary Examiner* — Brian D Nash
(74) *Attorney, Agent, or Firm* — Jason Rogers; Vichit Chea; King & Schickli, PLLC

(57) ABSTRACT

A bicycle attachment system for a truck bed includes a first compartment in the truck bed, a first access door providing access to the first compartment and a first bike fork trap in the first compartment. The bicycle attachment system is fully integrated into the motor vehicle.

15 Claims, 10 Drawing Sheets

(56) References Cited

U.S. PATENT DOCUMENTS

| | | | |
|---|---|---|---|
| 7,017,980 B1* | 3/2006 | Bejin | B60R 5/04 |
| | | | 296/193.07 |
| 7,059,646 B1* | 6/2006 | DeLong | B60R 5/04 |
| | | | 296/24.43 |
| 7,156,438 B2* | 1/2007 | Cowelchuk | B60R 7/04 |
| | | | 296/24.34 |
| 7,757,914 B2* | 7/2010 | Book | B60R 9/048 |
| | | | 224/324 |
| 8,002,331 B2* | 8/2011 | Bowers | B60N 2/3013 |
| | | | 296/183.2 |
| 8,348,322 B2* | 1/2013 | King | B60P 3/423 |
| | | | 296/183.2 |
| 8,763,870 B2 | 7/2014 | Davis | |
| 9,187,046 B2* | 11/2015 | Peck | B60R 9/10 |
| 9,254,791 B2 | 2/2016 | Wolfe | |
| 9,862,330 B2* | 1/2018 | Sayegh | B60R 9/06 |
| 2003/0057724 A1* | 3/2003 | Inagaki | B60N 2/3013 |
| | | | 296/37.8 |
| 2006/0255082 A1* | 11/2006 | Tsai | B60P 3/073 |
| | | | 224/403 |
| 2007/0286697 A1 | 12/2007 | Kmita et al. | |
| 2009/0173762 A1* | 7/2009 | Wang | B60P 3/073 |
| | | | 224/402 |
| 2013/0277404 A1 | 10/2013 | Heininger | |
| 2015/0151688 A1* | 6/2015 | Back | B60R 5/003 |
| | | | 224/539 |

* cited by examiner

BICYCLE ATTACHMENT SYSTEM FOR A TRUCK BED

TECHNICAL FIELD

This document relates generally to the motor vehicle equipment field and, more particularly, to a new and improved bicycle attachment system for a truck bed as well as to a related method of hauling a bicycle.

BACKGROUND

Pickup trucks are an increasingly popular selection for motor vehicle operators desiring increased cargo hauling capacity and versatility to support their active lifestyles. Typically a truck is equipped with aftermarket cargo hauling accessories particularly suited and designed for carrying a particular type of cargo of interest such as bicycles, kayaks, canoes, all-terrain vehicles, motorcycles and the like.

This document relates to a new and improved bicycle attachment system that is fully integrated into the truck bed of the motor vehicle and may be provided as part of the original equipment. Advantageously, the bicycle attachment system is custom designed for the particular truck bed in order to maximize ease of use and performance. In contrast, aftermarket bicycle attachment systems are generically designed to fit multiple different truck beds and are not customized for optimum performance with any particular truck bed. Further, the new and improved bicycle attachment system is fully concealed when not in use thereby providing an aesthetically pleasing appearance. In contrast, aftermarket bicycle attachment systems remain exposed when not in use, degrading the appearance of the motor vehicle. Significantly, aftermarket bicycle attachment systems must be removed and reinstalled if this appearance degradation is to be avoided. The removal and reinstallation can be an inconvenience and an annoyance that may be avoided with the new and improved bicycle attachment system disclosed in this document.

SUMMARY

In accordance with the purposes and benefits described herein, a bicycle attachment system is provided for a truck bed. That bicycle attachment system comprises a first compartment in the truck bed, a first access door providing access to the first compartment and a first bike fork trap in the first compartment.

The first compartment may be provided in a front wall of the truck bed. Further, the first access door may include a first hinge and the first access door may be pivoted on the first hinge between a first opened position, allowing access to the first bike fork trap in the first compartment, and a first closed position concealing the first bike fork trap. The first access door may form a first portion of the front wall of the truck bed.

The bicycle attachment system may further include a second compartment in the truck bed, a second access door providing access to the second compartment and a second bike fork trap in the second compartment. That second compartment may also be provided in the front wall of the truck bed.

The second access door may include a second hinge and the second access door may be pivoted about the second hinge between a second opened position allowing access to the second bike fork trap in the second compartment, and a second closed position concealing the second bike fork trap.

The second access door may form a second portion of the front wall of the truck bed. Further, the front wall may include a liner to protect the front wall of the truck bed from impact damage including scratched paint and dents from heavy objects or even the fork of a bicycle.

In another possible embodiment, the first compartment may be provided in a tailgate wall of the truck bed. In such an embodiment, the first access door may include a first guideway and the first access door may slide along the first guideway between a first opened position allowing access to the first bike fork trap in the first compartment, and a first closed position concealing the first bike fork trap. The first access door may form a first portion of the tailgate wall.

The bicycle attachment system may also include a second compartment in the truck bed, a second access door providing access to the second compartment and a second bike fork trap in the second compartment. The second compartment may be provided in the tailgate wall like the first compartment. Further, the second access door may include a second guideway and the second access door may slide along that second guideway between a second opened position allowing access to the second bike fork trap in the second compartment, and a second closed position concealing the second bike fork trap.

The second access door may form a second portion of the tailgate wall. Further, the tailgate wall may include a liner to protect the tailgate wall from dents, dings and scrapes.

In accordance with still another aspect, a method is provided of hauling a bicycle. That method comprises the steps of opening a first access door in a truck bed in order to access a first compartment including a first bike fork trap and securing a first bike fork to the first bike fork trap. In one or more of many possible embodiments, the method includes pivoting the first access door open. In another or more of many possible embodiments, the method includes sliding the first access door open.

In the following description, there are shown and described several preferred embodiments of the bicycle attachment system. As it should be realized, the bicycle attachment system is capable of other, different embodiments and their several details are capable of modification in various, obvious aspects all without departing from the bicycle attachment system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the bicycle attachment system and together with the description serve to explain certain principles thereof.

FIG. 1b is a side elevational view of the pickup truck illustrated in FIG. 1a.

Figure 6A:
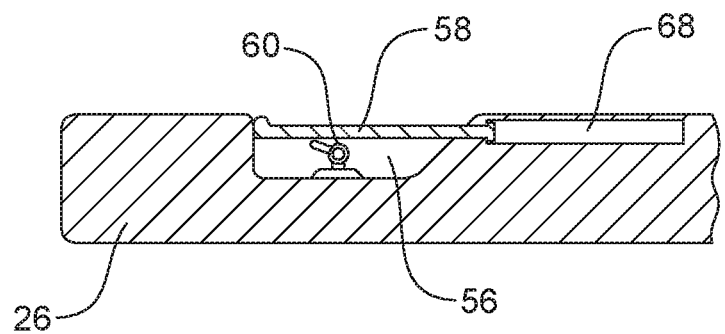
Figure 6B:
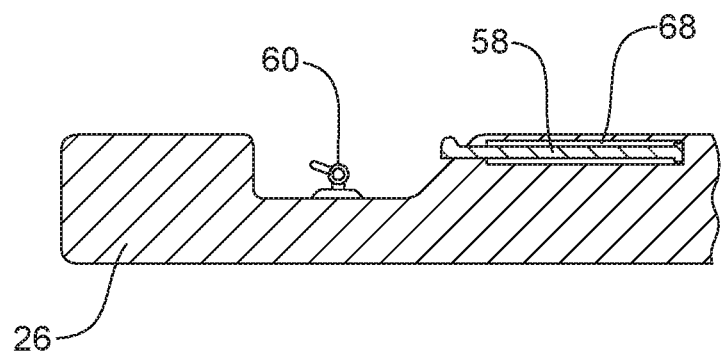

FIGS. 6a and 6b are detailed schematic illustrations of the first compartment, first access door and first bike fork trap in the tailgate. FIG. 6a illustrates the first access door in the first closed position. FIG. 6b illustrates the first access door in the first opened position.

Figure 7:
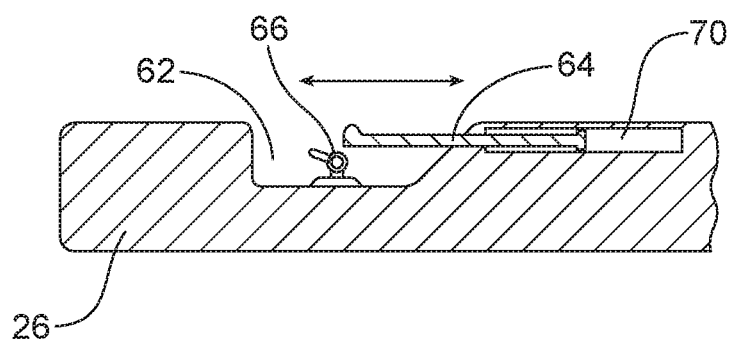

FIG. 7 is a detailed schematic view illustrating a second compartment in the tailgate having a second access door for accessing a second bike fork trap held in the second compartment.

Reference will now be made in detail to the present preferred embodiments of the bicycle attachment system, examples of which are illustrated in the accompanying drawing figures.

DETAILED DESCRIPTION

Figure 1A:
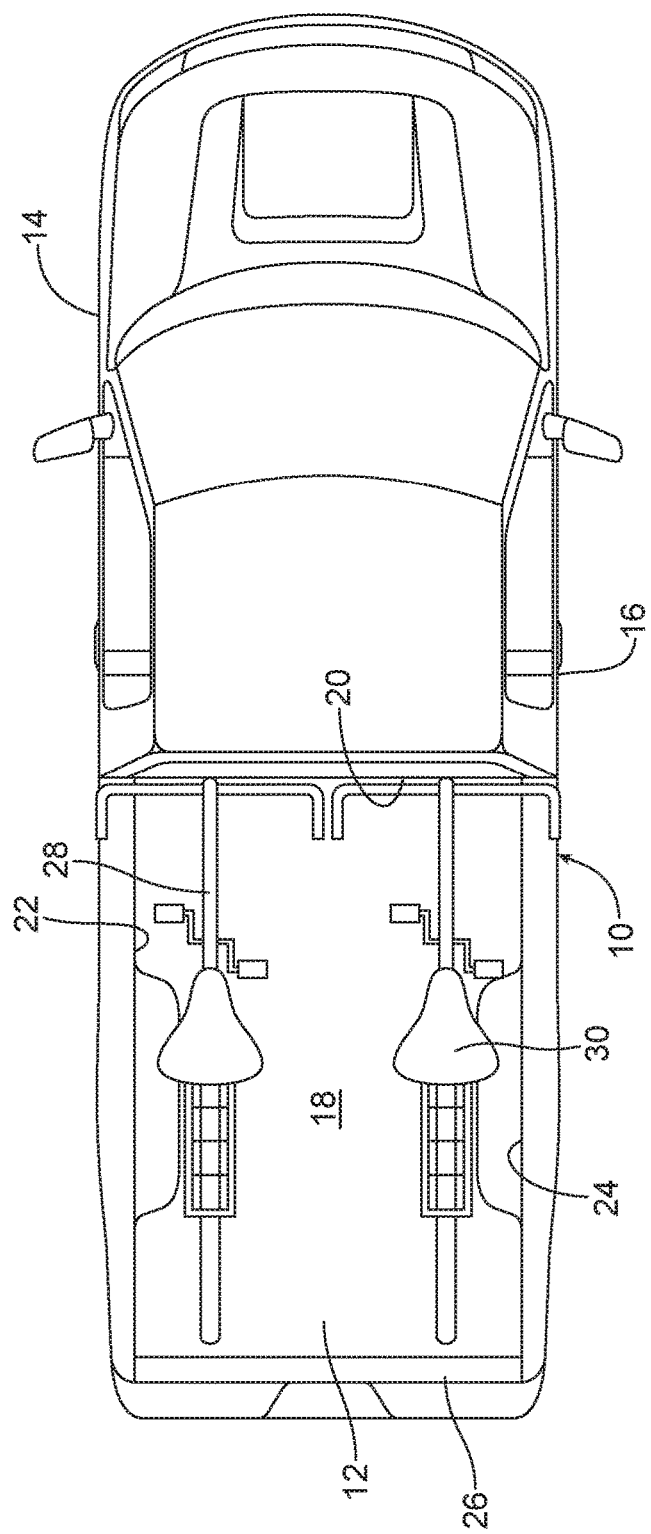
FIG. 1a is a top plan view of a pickup truck equipped with the bicycle attachment system and illustrating two bicycles held in the truck bed of the pickup truck with the forks of the two bicycles attached to bike fork traps provided at the front wall of the truck bed.
Figure 1B:
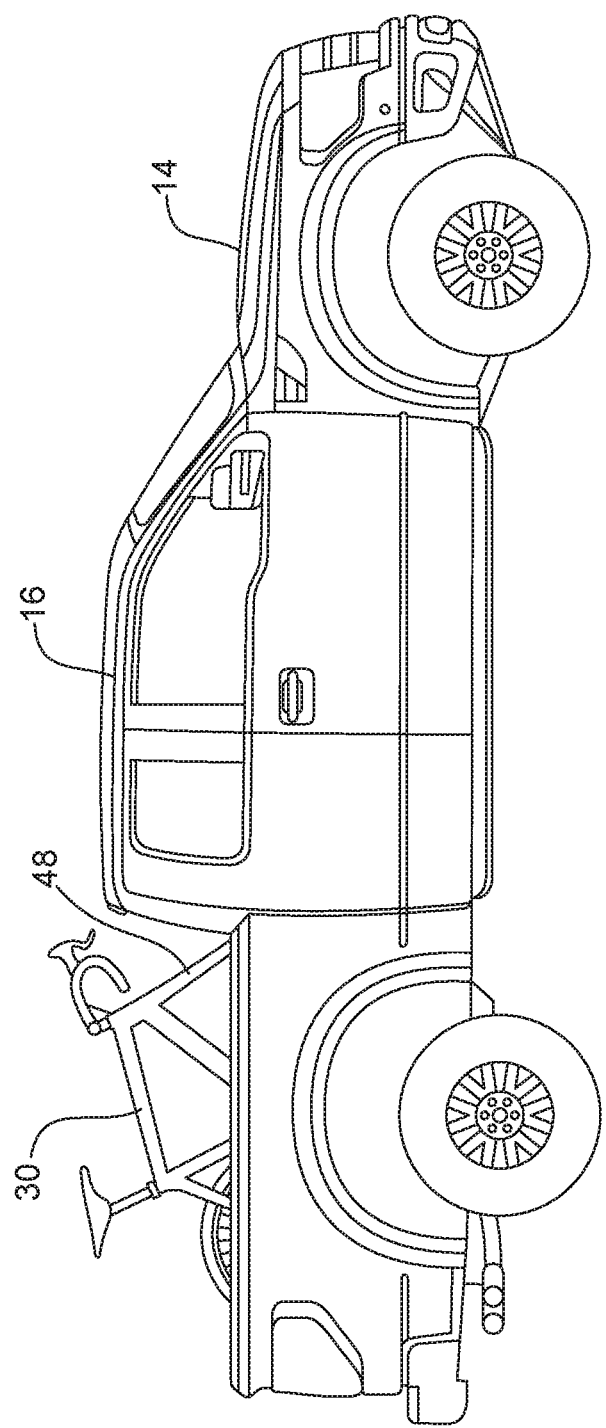

Reference is now made to FIGS. 1a, 1b, 2a, 2b and 3 illustrating a first possible embodiment of the bicycle attachment system 10 for a truck bed 12. In the illustrated embodiment, the truck bed 12 is part of a pickup truck 14 which includes a cab 16. The truck bed 12 includes a bed floor 18, a front wall 20, a first sidewall 22, a second sidewall 24 and a tailgate 26. As illustrated in FIG. 1a the bicycle attachment system 10 is being utilized to transport a first bicycle 28 and a second bicycle 30 in the truck bed 12 with the tailgate 26 closed.

As illustrated in FIGS. 2a, 2b , 2c and 3, the bicycle attachment system 10 includes a first compartment 32 in the front wall 20 of the truck bed 12. A first access door 34 provides access to the first compartment 32. A first bike fork trap 36, of a type known in the art, is provided in the first compartment 32. More specifically, the first access door 34 includes a first hinge 38. The first access door 34 pivots about the first hinge 38 between a first closed position illustrated in FIG. 2a and a first opened position illustrated in FIG. 2b. In the illustrated embodiment in FIG. 2b , the first access door 34 is actually a part of the liner 35 of the front wall 20 and the first compartment 32 is provided in that liner.

Figure 2A:
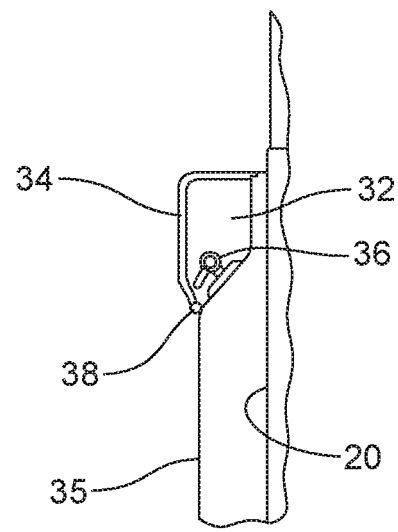
FIG. 2a is a detailed schematic illustration of the front wall of the pickup truck illustrated in FIGS. 1a and 1b illustrating the first compartment and the first access door for that compartment in the closed position.

As should be appreciated, the first access door 34 forms a first portion of the front wall 20. When the first access door 34 is closed as illustrated in FIG. 2a, the first bike fork trap 36 is fully concealed within the first compartment 32. When the first access door 34 is in the opened position illustrated in FIG. 2b, one may easily access the first bike fork trap 36 in order to attach a bike fork 40 of the first bicycle 28 to the first bike fork trap 36.

Figure 2B:
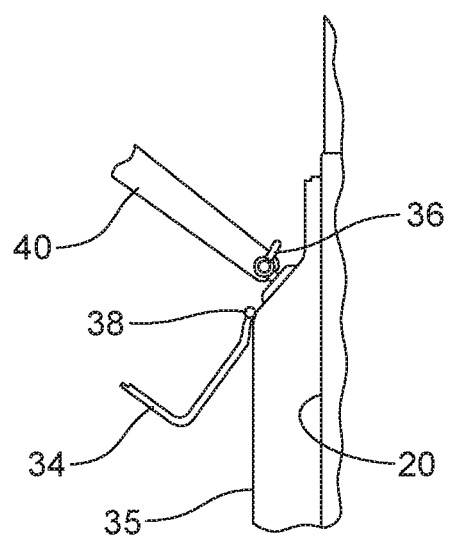
FIG. 2b is a view similar to FIG. 2a but illustrating the first access door in the open position and a front fork of a bicycle secured to the first bike fork trap held in the first compartment.
Figure 2C:
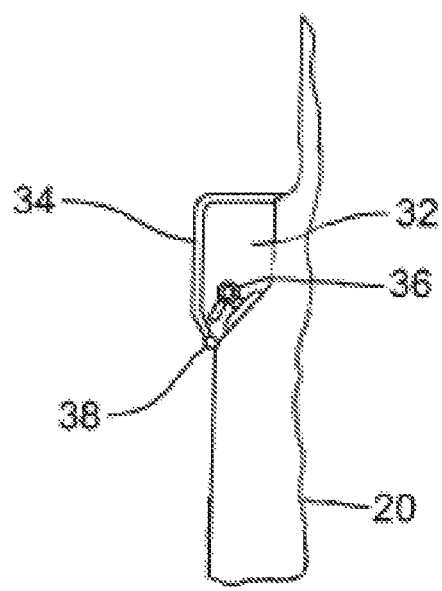
FIG. 2c is a detailed schematic illustration of the front wall of the pickup truck illustrated in FIGS. 1a and 1b illustrating the first compartment in the front wall in a closed position.
Figure 3:
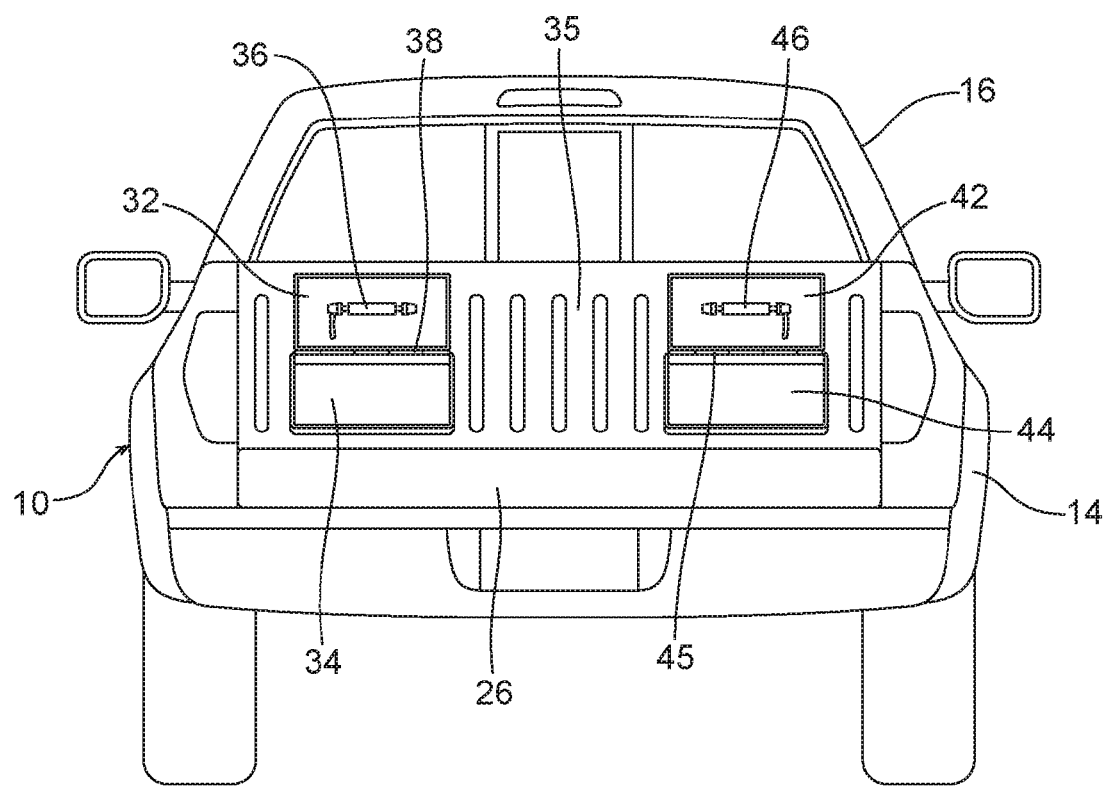
FIG. 3 is a rear elevational view of the pickup truck illustrated in FIGS. 1a and 1b illustrating the two access doors opened to provide access to the first bike fork trap and the second bike fork trap.

In the embodiment of the bicycle attachment system 10 illustrated in FIGS. 1a, 1b, 2a, 2b and 3, the bicycle attachment system 10 also includes a second compartment 42 in the front wall 20 of the truck bed 12, a second access door 44 providing access to the second compartment and a second bike fork trap 46 in the second compartment. The second access door 44 is displaceable about a second hinge 45 between a second closed position and a second opened position just like the first access door 34 as illustrated in FIGS. 2a and 2b. FIG. 3 shows the first access door and the second access door in the opened positions with the first bike fork trap 36 in the first compartment 32 and the second bike fork trap 46 in the second compartment 42 exposed to allow the first bike fork trap 36 to receive the first bike fork 40 of the first bicycle 28 and the second bike fork trap 46 to receive the second bike fork 48 of the second bicycle 30.

An alternative embodiment of the bicycle attachment system 50 is illustrated in FIGS. 4a, 4b, 5, 6a and 6b.

Figure 4A:
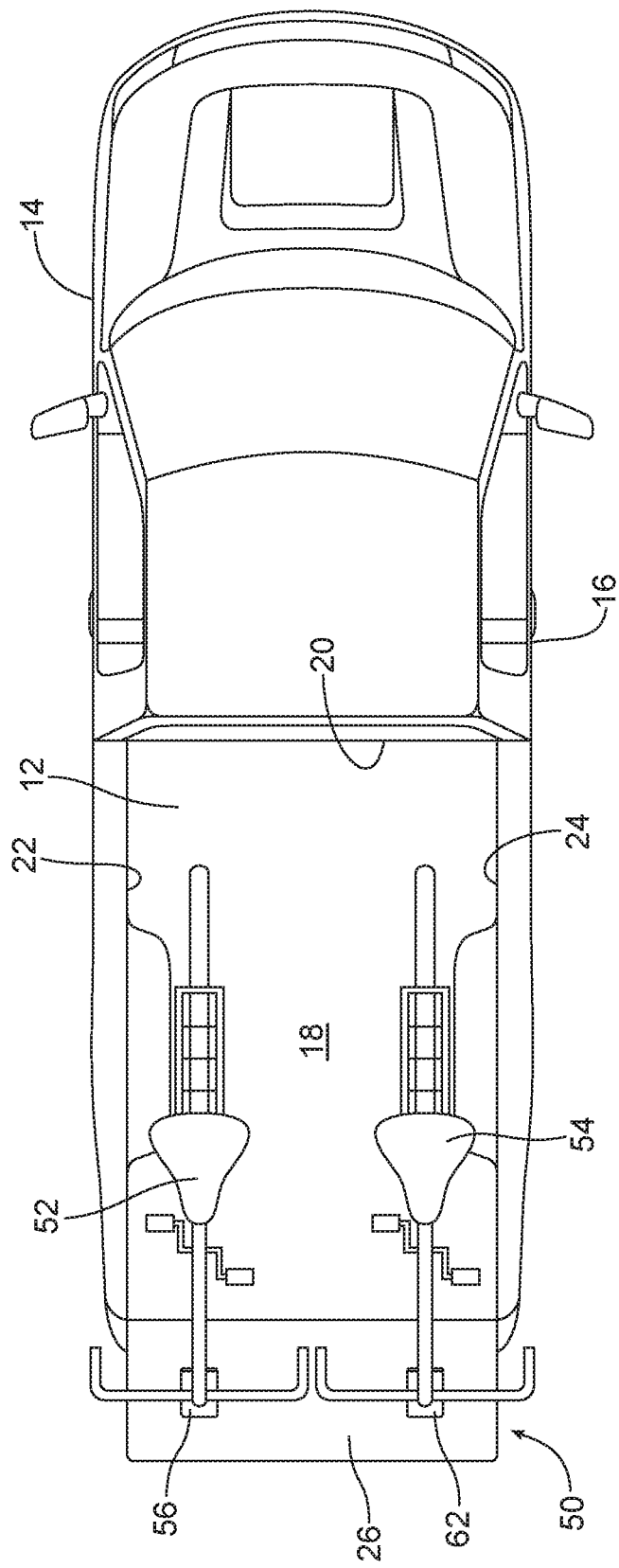
FIGS. 4a and 4b are respective top plan and side elevational views illustrating a second embodiment of the bicycle attachment system with two bicycles secured to the first and second bike fork traps provided on the tailgate of the pickup truck.
Figure 4B:
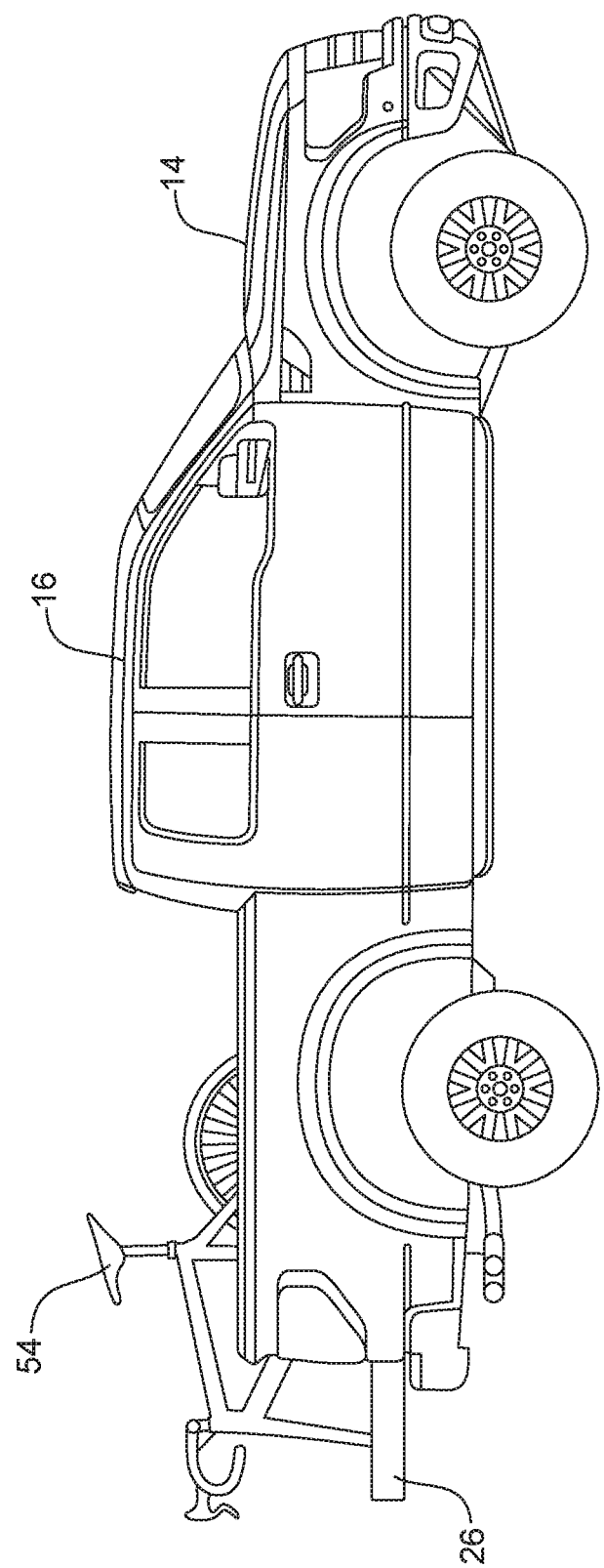

As illustrated in FIGS. 4a and 4b, the second embodiment of the bicycle attachment system 50 also allows the carrying of two bicycles 52, 54 in the truck bed 12 of the pickup truck 14 behind the cab 16. In this embodiment, the tailgate 26 is opened so that the interior wall of the tailgate forms a part of the truck bed floor 18 with the bicycles 52, 54 securely held in the truck bed 12 between the first sidewall 22 and the second sidewall 24 spaced from the front wall 20.

Figure 5:
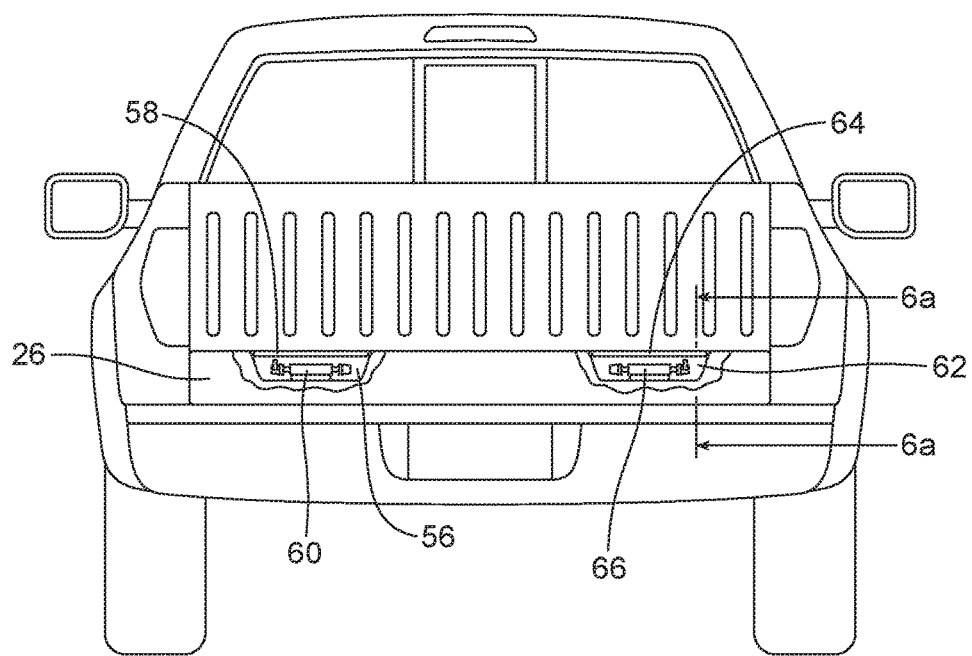
FIG. 5 is a rear elevational view of the pickup truck illustrated in FIGS. 4a and 4b showing the two compartments in the tailgate that hold the two bike fork traps.

More specifically, as illustrated in FIG. 5, the bicycle attachment system 50 includes a first compartment 56 provided in the tailgate 26, a first access door 58 providing access to the first compartment and a first bike fork trap 60 provided on the tailgate in the first compartment.

Further, the bicycle attachment system 50 includes a second compartment 62 provided in the tailgate 26, a second access door 64 providing access to the second compartment and a second bike fork trap 66 in the second compartment.

As illustrated in FIG. 6a, the first access door 58 includes a first guideway 68 in the tailgate 26. The first access door 58 slides along the first guideway 68 between a first closed position illustrated in FIG. 6a concealing the first bike fork trap 60 from view and a first opened position illustrated in FIG. 6b allowing access to the first bike fork trap 60. Similarly, as illustrated in FIG. 7, the second access door 64 slides along a second guideway 70 between a second opened position allowing access to the second compartment, and a second closed position concealing the second bike fork trap 66.

As should be appreciated, either embodiment of the bicycle attachment system 10 or 50 may be utilized in a simple and efficient method of hauling a bicycle 28, 30, 52 or 54. That method includes opening a first access door 34 or 58 in a truck bed 12 in order to access a first compartment 32 or 56 including a first bike fork trap 36 or 60 and securing a first bicycle 28 or 52 to the first bike fork trap. In the embodiment illustrated in FIGS. 1a, 1b, 2a, 2b and 3, the method includes the step of pivoting the first access door 34 open. In the embodiment illustrated in FIGS. 4a, 4b, 5, 6a, 6b and 7 the method includes sliding the first access door 58 open.

Of the bicycle attachment system 10 illustrated in FIGS. 1a, 1b, 2a, 2b and 3, the first access door 34 and the second access door 44 form respective first and second portions of the front wall 20 of the truck bed 12. Thus, when the access doors 34 and 44 are closed to conceal the first bike fork trap 36 and second bike fork trap 46, the first and second compartments 32, 42 and first and second bike fork traps are virtually invisible, fully integrated within the truck bed 12 making it possible to maintain an aesthetically pleasing appearance. Where the front wall 20 includes a protective resilient liner 35, in order to protect the truck bed 12 and particularly the front wall 20 from dings and scratches, the first access door 34 and the second access door 44 may form respective first and second parts or portions of that liner.

In the first embodiment of the bicycle attachment system 10 illustrated in FIGS. 1a, 1b, 2a, 2b and 3, the bicycles 28 and 30 may be hauled in the truck bed 12 with the tailgate 26 closed. This may be desired by some operators.

In contrast, the second embodiment of the bicycle attachment system 50 provides for the hauling of the bicycles 52, 54 with the tailgate 26 opened. This may be preferred by some individuals as it is easier to access the first bike fork trap 60 and the second bike fork trap 66 from the ground without having to climb into the truck bed 12. In this second embodiment of the bicycle attachment system 50, it should be appreciated that the first access door 58 and the second access door 64 may form respective first and second portions of the interior wall of the tailgate 26 so that the bicycle attachment system is once again seen to be fully integrated into the design of the truck bed 12 making the bicycle attachment system virtually invisible when the access doors are closed, thereby maintaining the aesthetic appearance of the pickup truck 14. Where the tailgate 26 includes a liner (not shown), the first and second access doors 58, 64 may be a part of that liner.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A bicycle attachment system, comprising:
    a truck bed including at least one wall, wherein the at least one wall is a front wall of said truck bed;
    a first access door adapted for at least partially forming a first compartment between said first access door and a portion of the at least one wall of the truck bed, said first compartment provided in the front wall of said truck bed, and said first access door further adapted for providing access to said first compartment; and
    a first bike fork trap in said first compartment,
    wherein said first access door includes a first hinge and said first access door pivots about said first hinge between a first opened position allowing access to said first compartment and a first closed position concealing said first bike fork trap.

2. The bicycle attachment system of claim 1, wherein said first access door forms a first portion of said front wall.

3. The bicycle attachment system of claim 2, further including a second access door at least partially forming a second compartment with a second portion of the at least one wall of the truck bed, said second access door providing access to said second compartment and a second bike fork trap in said second compartment.

4. The bicycle attachment system of claim 3, wherein said second compartment is provided in said front wall.

5. The bicycle attachment system of claim 4, wherein said second access door includes a second hinge and said second access door pivots about said second hinge between a second opened position allowing access to said second compartment and a second closed position concealing said second bike fork trap.

6. The bicycle attachment system of claim 5, wherein said second access door forms a second portion of said front wall.

7. The bicycle attachment system of claim 6, wherein said front wall includes a liner.

8. A bicycle attachment system comprising:
    a truck bed including at least one wall, wherein said at least one wall comprises a tailgate wall of said truck bed;
    a first access door adapted for at least partially forming a first compartment between said first access door and a portion of the at least one wall of the truck bed, said first compartment provided in said tailgate wall, and said first access door further adapted for providing access to said first compartment; and
    a first bike fork trap in said first compartment.

9. The bicycle attachment system of claim 8, wherein said first access door includes a first guideway and said first access door slides along said first guideway between a first opened position allowing access to said first compartment and a first closed position concealing said first bike fork trap.

10. The bicycle attachment system of claim 9, wherein said first access door forms a first portion of said tailgate wall.

11. The bicycle attachment system of claim 10, further a second access door at least partially forming a second compartment with a second portion of the at least one wall of the truck bed, said second access door providing access to said second compartment and a second bike fork trap in said second compartment.

12. The bicycle attachment system of claim 11, wherein said second compartment is provided in said tailgate wall.

13. The bicycle attachment system of claim 12, wherein said second access door includes a second guideway and said second access door slides along said second guideway between a second opened position allowing access to said second compartment and a second closed position concealing said second bike fork trap.

14. The bicycle attachment system of claim 13, wherein said second access door forms a second portion of said tailgate wall.

15. The bicycle attachment system of claim 14, wherein said tailgate wall includes a liner.

* * * * *